US011577226B2

(12) United States Patent
Nakahigashi et al.

(10) Patent No.: US 11,577,226 B2
(45) Date of Patent: Feb. 14, 2023

(54) EXHAUST GAS PURIFICATION CATALYST

(71) Applicants: Seiji Nakahigashi, Toyota (JP); Isao Chinzei, Toyota (JP); Shogo Shirakawa, Toyota (JP); Hiromasa Suzuki, Toyota (JP); Masahide Miura, Toyota (JP); Takahiro Nishio, Toyota (JP); Norimichi Shimano, Toyota (JP); Hiroki Nihashi, Kakegawa (JP); Mitsuyoshi Okada, Kakegawa (JP); Takashi Onozuka, Kakegawa (JP); Souta Akiyama, Kakegawa (JP); Hiromi Togashi, Kakegawa (JP); Takahiro Noguchi, Kakegawa (JP); Isao Naito, Kakegawa (JP)

(72) Inventors: Seiji Nakahigashi, Toyota (JP); Isao Chinzei, Toyota (JP); Shogo Shirakawa, Toyota (JP); Hiromasa Suzuki, Toyota (JP); Masahide Miura, Toyota (JP); Takahiro Nishio, Toyota (JP); Norimichi Shimano, Toyota (JP); Hiroki Nihashi, Kakegawa (JP); Mitsuyoshi Okada, Kakegawa (JP); Takashi Onozuka, Kakegawa (JP); Souta Akiyama, Kakegawa (JP); Hiromi Togashi, Kakegawa (JP); Takahiro Noguchi, Kakegawa (JP); Isao Naito, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 302 days.

(21) Appl. No.: 17/107,997

(22) Filed: Dec. 1, 2020

(65) Prior Publication Data
US 2021/0205790 A1   Jul. 8, 2021

(30) Foreign Application Priority Data
Dec. 26, 2019   (JP) .............................. JP2019-236035

(51) Int. Cl.
B01J 23/46   (2006.01)
B01J 23/42   (2006.01)
B01J 35/02   (2006.01)
F01N 3/10   (2006.01)
B82Y 30/00   (2011.01)

(52) U.S. Cl.
CPC ............. *B01J 23/464* (2013.01); *B01J 23/42* (2013.01); *B01J 35/023* (2013.01); *B01J 35/026* (2013.01); *F01N 3/105* (2013.01); *B82Y 30/00* (2013.01); *F01N 2510/0684* (2013.01); *F01N 2570/16* (2013.01)

(58) Field of Classification Search
CPC ........ B01J 23/464; B01J 23/42; B01J 35/023; B01J 35/026; F01N 3/105
See application file for complete search history.

(56) References Cited

U.S. PATENT DOCUMENTS

| 6,047,544 A | 4/2000 | Yamamoto et al. |
| 8,168,560 B2 | 5/2012 | Taki et al. |
| 8,337,791 B2 | 12/2012 | Kohara et al. |
| 2015/0375206 A1 | 12/2015 | Aoki |
| 2018/0304238 A1 | 10/2018 | Saito et al. |
| 2020/0290019 A1 | 9/2020 | Onoe et al. |
| 2020/0391186 A1 | 12/2020 | Shirakawa et al. |

FOREIGN PATENT DOCUMENTS

| JP | 2000051707 A | 2/2000 |
| JP | 2007038085 A | 2/2007 |
| JP | 2014151306 A | 8/2014 |
| JP | 2014152306 A | * 8/2014 |
| JP | 2016147256 A | 8/2016 |
| JP | 2018176109 A | 11/2018 |
| WO | 2009089151 A1 | 7/2009 |
| WO | 2017159628 A1 | 9/2017 |
| WO | 2017179679 A1 | 10/2017 |
| WO | 2020175142 A1 | 9/2020 |

OTHER PUBLICATIONS

Isao Chinzei et al., U.S. Appl. No. 17/211,112, filed Mar. 24, 2021.

* cited by examiner

*Primary Examiner* — Yong L Chu
(74) *Attorney, Agent, or Firm* — Dickinson Wright, PLLC

(57) ABSTRACT

The present disclosure provides an exhaust gas purification catalyst having an improved Rh activation, which comprises a substrate and a catalyst coat layer formed on the substrate, the catalyst coat layer having a two-layer structure, wherein the catalyst coat layer includes an upstream portion on an upstream side and a downstream portion on a downstream side in an exhaust gas flow direction, and a part or all of the upstream portion is formed on a part of the downstream portion, wherein the upstream portion contains Rh fine particles and Pt, wherein the Rh fine particles have an average particle size measured by a transmission electron microscope observation of 1.0 nm or more to 2.0 nm or less, and a standard deviation σ of the particle size of 0.8 nm or less, and wherein the downstream portion contains Rh.

3 Claims, 4 Drawing Sheets

EXHAUST GAS PURIFICATION CATALYST

CROSS REFERENCE TO RELATED APPLICATIONS

The present application claims priority from Japanese patent application JP 2019-236035 filed on Dec. 26, 2019, the entire content of which is hereby incorporated by reference into this application.

BACKGROUND

Technical Field

The present disclosure relates to an exhaust gas purification catalyst.

Background Art

An exhaust gas discharged from an internal combustion engine of an automobile and the like contains harmful components, such as carbon monoxide (CO), hydrocarbons (HC), and nitrogen oxides (NOx), and the harmful components are purified by an exhaust gas purification catalyst before discharged into the atmosphere. Conventionally, a three-way catalyst that simultaneously performs oxidation of CO and HC and reduction of NOx is used as the exhaust gas purification catalyst, and a catalyst that uses a noble metal, such as platinum (Pt), palladium (Pd), and rhodium (Rh), as a catalyst metal is widely employed as the three-way catalyst.

Recently, while emission regulations have become stricter, the amount of the noble metals used for the exhaust gas purification catalyst is desired to be reduced from the aspect of the resource risk. Among the noble metals, Rh plays a role in NOx reduction activity, and highly activating Rh provides an expectation of the reduction of the noble metal amount while complying with the emission regulations.

As one method for reducing the usage of the noble metal in the exhaust gas purification catalyst, there has been known a method to use the noble metal by supporting the noble metal as fine particles on a carrier. For example, JP 2016-147256 A discloses a method for manufacturing a catalyst that includes a step of supporting noble metal particles on an oxide carrier to obtain a noble metal supported catalyst and a step of performing a heating process to the noble metal supported catalyst in a reducing atmosphere to control a particle size of the noble metal in a predetermined range. JP 2016-147256 A discloses that the particle sizes of the noble metal particles on the oxide carrier were able to be controlled in a range of 2.8 nm or more to 3.8 nm or less in Examples.

JP 2007-38085 A discloses a method for manufacturing a catalyst that includes a step of causing a reductant to act to a catalyst in which noble metal particles are supported on an oxide carrier, enlarging the noble metal particles having small particle sizes, and obtaining the minimum particle size of the noble metal particles of 1 nm or more. JP 2007-38085 A discloses that the particle sizes of the noble metal particles on the oxide carrier were able to be controlled to 3.0 nm or more to 4.1 nm or less in Examples.

A structure of a catalyst coat layer and an addition position of a catalyst metal to maximally provide the effect of the catalyst have been examined. For example, JP 2014-151306 A discloses a catalytic converter that includes a substrate that has a cell structure through which an exhaust gas flows and a catalyst layer formed on a cell wall surface of the substrate. The catalyst layers include a first catalyst layer disposed on an upstream side of the substrate in an exhaust gas flow direction and a second catalyst layer disposed on a downstream side in the exhaust gas flow direction. The first catalyst layer contains rhodium, and the second catalyst layer contains palladium or platinum.

However, for the conventional catalyst that uses Rh fine particles whose particle sizes are controlled, the Rh fine particles are aggregated to be deteriorated during the catalytic reaction, thus failing to provide sufficient durability of the catalyst in some cases. Since the improvement of the catalyst durability ensures effective use of Rh, the usage of Rh can be reduced. For the conventional catalyst that uses the Rh fine particles whose particle sizes are controlled, the addition position to further activate Rh has not been sufficiently examined.

SUMMARY

As described above, for the conventional exhaust gas purification catalyst that uses the Rh fine particles whose particle sizes are controlled, the catalyst durability is not sufficient in some cases, and there is also a room for improving the addition position for further activating Rh. Accordingly, the present disclosure provides an exhaust gas purification catalyst having an improved Rh activation.

The inventors examined various means to solve the problem, and found that the use of Rh fine particles in which an average particle size and a standard deviation σ of the particle size are controlled in specific ranges to an upstream portion of a catalyst coat layer ensures further activating Rh. Thus, the inventors achieved the present disclosure.

That is, the gist of the present disclosure is as follows.
(1) An exhaust gas purification catalyst comprising a substrate and a catalyst coat layer formed on the substrate, the catalyst coat layer having a two-layer structure, wherein the catalyst coat layer includes an upstream portion on an upstream side and a downstream portion on a downstream side in an exhaust gas flow direction, and a part or all of the upstream portion is formed on a part of the downstream portion, wherein the upstream portion contains Rh fine particles and Pt, wherein the Rh fine particles have an average particle size measured by a transmission electron microscope observation of 1.0 nm or more to 2.0 nm or less, and a standard deviation σ of the particle size of 0.8 nm or less, and wherein the downstream portion contains Rh.
(2) The exhaust gas purification catalyst according to (1), wherein a content of the Rh fine particles in the upstream portion is 1.0% by weight or more to 45% by weight or less based on a total content of the Rh fine particles in the upstream portion and Rh in the downstream portion.
(3) The exhaust gas purification catalyst according to (1) or (2), wherein the upstream portion further contains an OSC material that has an oxygen storage capacity.

The present disclosure can provide the exhaust gas purification catalyst having the improved Rh activation.

DETAILED DESCRIPTION

The following describes embodiments of the present disclosure in detail.

An exhaust gas purification catalyst of the present disclosure comprises a substrate and a catalyst coat layer formed on the substrate. The catalyst coat layer has a two-layer structure that includes an upstream portion on the upstream side and a downstream portion on the downstream side in an exhaust gas flow direction, and a part or all of the upstream portion is formed on a part of the downstream portion. That is, the downstream portion has a single layer portion not coated with the upstream portion.

Figure 1:
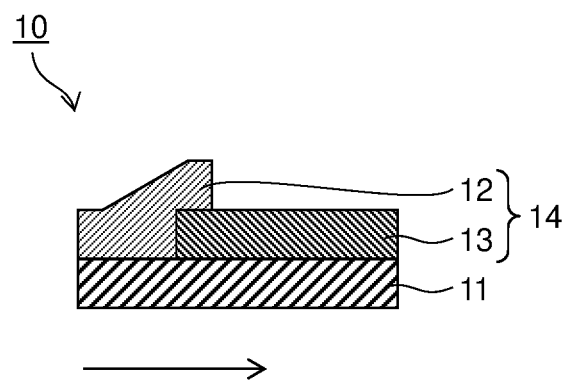
FIG. 1 is a cross-sectional schematic diagram illustrating a first embodiment of an exhaust gas purification catalyst of the present disclosure.

FIG. 1 illustrates a first embodiment of the exhaust gas purification catalyst of the present disclosure. As illustrated in FIG. 1, an exhaust gas purification catalyst 10 comprises a substrate 11 and a catalyst coat layer 14 of a two-layer structure formed on the substrate 11. The catalyst coat layer 14 includes an upstream portion 12 and a downstream portion 13, and a part of the upstream portion 12 is formed on a part of the downstream portion 13. In FIG. 1, an arrow indicates the exhaust gas flow direction.

Here, for the catalyst coat layer, the upstream portion is formed in a predetermined range from an upstream end surface in the exhaust gas flow direction. In the exhaust gas purification catalyst of the present disclosure, since the upstream portion is formed on a part of the downstream portion, the upstream portion is not formed up to a downstream end surface. That is, a coat width of the upstream portion is a length in a range of less than 100% of the entire length of the substrate from the upstream end surface. Meanwhile, the downstream portion only needs to be formed at least from the downstream end surface, and may be formed over the entire length of the substrate. That is, a coat width of the downstream portion is a length in a range of 100% or less of the entire length of the substrate from the downstream end surface. When the downstream portion is formed over the entire length of the substrate, all of the upstream portion is formed on a part of the downstream portion.

Figure 2:
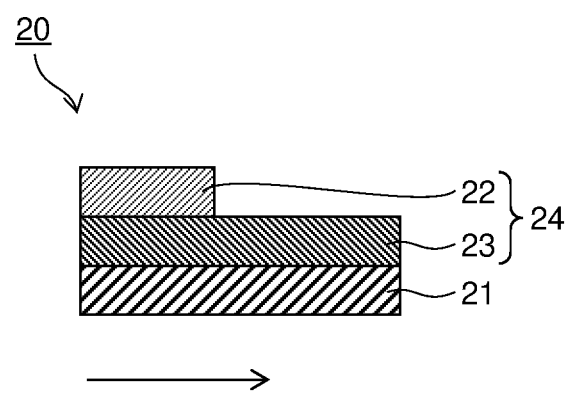
FIG. 2 is a cross-sectional schematic diagram illustrating a second embodiment of the exhaust gas purification catalyst of the present disclosure.

FIG. 2 illustrates a second embodiment of the exhaust gas purification catalyst of the present disclosure. As illustrated in FIG. 2, in an exhaust gas purification catalyst 20, a catalyst coat layer 24 includes an upstream portion 22 and a downstream portion 23 and, all of the upstream portion 22 is formed on a part of the downstream portion 23. In the exhaust gas purification catalyst 20, the downstream portion 23 as a lower layer is formed on a substrate 21, and the upstream portion 22 as an upper layer is formed on a part of the downstream portion 23. In FIG. 2, an arrow indicates the exhaust gas flow direction.

The coat width of the upstream portion of the catalyst coat layer is a length in a range of 80% or less of the entire length of the substrate from the upstream end surface in some embodiments, or may be 70% or less, or 50% or less. For example, the coat width of the upstream portion may be the length in a range of 40% or less, or 30% or less.

The coat width of the downstream portion of the catalyst coat layer is a length in a range of 100% or less of the entire length of the substrate from the downstream end surface as describe above, and the length in a range of 90% or less, or 80% or less in some embodiments. For example, the coat width of the downstream portion may be the length in a range of 60% or less, or 40% or less. The coat width of the downstream portion of the catalyst coat layer is the length in a range of 60% or more to 100% or less of the entire length of the substrate from the downstream end surface in some embodiments.

In the catalyst coat layer of the exhaust gas purification catalyst of the present disclosure, a part or all of the upstream portion overlaps a part of the downstream portion. A width of the portion in which the upstream portion overlaps the downstream portion is a length in a range of 10% or more to 60% or less of the entire length of the substrate in some embodiments, or may be 10% or more to 40% or less.

The substrate used for the exhaust gas purification catalyst of the present disclosure is not specifically limited, and a generally used material in a honeycomb shape having multiple cells can be used. The material of the substrate includes a ceramic material having heat resistance, such as cordierite ($2MgO.2Al_2O_3.5SiO_2$), alumina, zirconia, and silicon carbide, and a metal material formed of a metal foil, such as a stainless steel. From the aspect of cost, the cordierite is used in some embodiments.

The upstream portion of the catalyst coat layer contains rhodium (Rh) fine particles (hereinafter also referred to as particle size-controlled Rh fine particles), whose average particle size and standard deviation $\sigma$ of the particle size are controlled to specific ranges, as a catalyst metal. Because of the relatively small average particle size, the particle size-controlled Rh fine particles have a significantly large specific surface area, thus having a high catalytic activity. Since the particle size-controlled Rh fine particles have a narrow particle size distribution and low proportions of coarse particles and fine particles, the particle size-controlled Rh fine particles have high durability and high catalytic activity. By the use of the particle size-controlled Rh fine particles to the upstream portion of the catalyst coat layer, NOx purification ability is improved in the upstream portion, through which the exhaust gas passes first, and Rh can be effectively used for the NOx purification also in the downstream portion through which the exhaust gas subsequently passes, thereby ensuring reduction of usage of Rh in the exhaust gas purification catalyst.

The particle size-controlled Rh fine particles have the average particle size of 1.0 nm or more to 2.0 nm or less. In the present disclosure, the average particle size of the particle size-controlled Rh fine particles is a number average particle size obtained by directly measuring projected area equivalent diameters based on an image taken in an observation with a transmission electron microscope (TEM) and analyzing particle groups having a cardinal number of 100 or more.

By controlling the average particle size of the particle size-controlled Rh fine particles to 1.0 nm or more, the proportion of fine particles having the particle size of less than 1.0 nm, which are considered to be aggregated to cause coarsening during a catalytic reaction, can be reduced. Therefore, the deterioration of the Rh fine particles can be suppressed, thus ensuring the improved catalyst durability. Meanwhile, by controlling the average particle size of the particle size-controlled Rh fine particles to 2.0 nm or less, the surface areas of the Rh fine particles can be increased, thus ensuring the improved catalytic activity. The average particle size of the particle size-controlled Rh fine particles is 1.1 nm or more in some embodiments, or may be 1.2 nm or more. The average particle size of the particle size-controlled Rh fine particles is 1.9 nm or less in some embodiments, or may be 1.8 nm or less or 1.6 nm or less. The average particle size of the particle size-controlled Rh fine particles is 1.1 nm or more to 1.9 nm or less in some embodiments, or may be 1.2 nm or more to 1.8 nm or less.

The particle size-controlled Rh fine particles have a standard deviation σ of the particle size, which is measured by the transmission electron microscope observation, of 0.8 nm or less. Since the particle size-controlled Rh fine particles have the standard deviation σ of the particle size of 0.8 nm or less, the particle size distribution is sharp, and the proportions of the fine particles and the coarse particles are low. Because of the small number of the fine particles, the aggregation of the Rh fine particles during the catalytic reaction is suppressed, thereby suppressing the deterioration of Rh and improving the catalyst durability. Because of the small number of the coarse particles, the surface areas of the Rh fine particles are increased, thereby improving the catalytic activity.

The standard deviation σ of the particle size-controlled particle size of the Rh fine particles is 0.7 nm or less in some embodiments, or may be 0.6 nm or less or 0.5 nm or less. While the particle sizes of the particle size-controlled Rh fine particles may be monodispersed, the effects of the disclosure can be provided even when the standard deviation σ is 0.2 nm or more, 0.3 nm or more, or 0.4 nm or more.

For the particle size-controlled Rh fine particles, the proportion of the fine particles having the particle size of less than 1.0 nm is especially reduced. Because of the small proportion of the fine particles having the particle size of less than 1.0 nm, the aggregation of the Rh fine particles during the catalytic reaction is suppressed, thereby suppressing the deterioration of Rh and improving the catalyst durability. For the particle size-controlled Rh fine particles, the proportion of the Rh fine particles having the particle size of less than 1.0 nm is 5% by weight or less based on the total weight of the Rh fine particles in some embodiments. This value may be 4% by weight or less, 3% by weight or less, 2% by weight or less, 1% by weight or less, 0.5% by weight or less, 0.3% by weight or less, or 0.1% by weight or less. The Rh fine particles having the particle size of less than 1.0 nm does not have to be contained at all.

In some embodiments, the particle size-controlled Rh fine particles have the average particle size of 1.2 nm or more to 1.8 nm or less in the measurement by the transmission electron microscope, and the proportion of the Rh fine particles having the particle size of less than 1.0 nm is 5.0% by weight or less based on the total weight of the Rh fine particles.

The content of the particle size-controlled Rh fine particles in the upstream portion of the catalyst coat layer is 0.01 g/L or more to 0.5 g/L or less based on the volume of the substrate in some embodiments, or may be 0.05 g/L or more to 0.2 g/L or less. When the content of the particle size-controlled Rh fine particles in the upstream portion is 0.01 g/L or more to 0.5 g/L or less, the high NOx purification ability and the high low-temperature activity of the catalyst can be provided at the same time.

The content of the particle size-controlled Rh fine particles in the upstream portion of the catalyst coat layer is 1.0% by weight or more to 45% by weight or less based on the total content of the particle size-controlled Rh fine particles in the upstream portion and Rh in the downstream portion in some embodiments, or may be 1.0% by weight or more to 40% by weight or less. When the content of the particle size-controlled Rh fine particles in the upstream portion is 1.0% by weight or more to 45% by weight or less, the high NOx purification ability and the high low-temperature activity of the catalyst can be provided at the same time.

The upstream portion of the catalyst coat layer contains platinum (Pt) as a catalyst metal in addition to the particle size-controlled Rh fine particles. The upstream portion of the catalyst coat layer containing Pt ensures sufficiently converting HC in the exhaust gas in the upstream portion, and ensures converting NOx in the state of suppressing HC poisoning in the downstream portion containing Rh.

The Pt content in the upstream portion of the catalyst coat layer is 0.01 g/L or more to 10 g/L or less based on the volume of the substrate in some embodiments, or may be 0.1 g/L or more to 5 g/L or less. When the Pt content in the upstream portion is 0.01 g/L or more to 10 g/L or less, the HC in the exhaust gas can be sufficiently converted.

The upstream portion of the catalyst coat layer may contain a catalyst metal other than Rh or Pt. As the catalyst metal, a platinum group noble metal, such as ruthenium (Ru), palladium (Pd), osmium (Os), and iridium (Ir), can be used.

The upstream portion of the catalyst coat layer contains an OSC material that has an oxygen storage capacity in some embodiments. The OSC material is an inorganic material having the oxygen storage capacity. The OSC material stores oxygen when a lean exhaust gas is supplied and releases the stored oxygen when a rich exhaust gas is supplied, thereby absorbing and reducing fluctuation of the exhaust gas atmosphere to ensure keeping the exhaust gas atmosphere to the proximity of a stoichiometric air-fuel ratio. A three-way catalyst highly efficiently purifies harmful components, such as CO, HC, and NOx, at the proximity of the stoichiometric air-fuel ratio. Accordingly, the upstream portion of the catalyst coat layer containing the OSC material ensures efficient purification of the harmful components in the upstream portion through which the exhaust gas passes at first.

The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, the ceria-zirconia ($CeO_2$—$ZrO_2$) composite oxide is used in some embodiments because of the high oxygen storage capacity and the relatively low price. The ceria-zirconia composite oxide may contain an oxide of a metallic element other than Ce or Zr. The metallic element other than Ce or Zr is a rare earth element (note that, Ce is excluded) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments, or may be Y and La. The ceria-zirconia composite oxide is used in a form of a composite oxide with lanthana ($La_2O_3$) and yttria ($Y_2O_3$) in some embodiments. The mixture ratio of ceria to zirconia in the ceria-zirconia composite oxide is $CeO_2/ZrO_2$=0.2 or more to 9.0 or less based on the weight in some embodiments.

The content of the OSC material in the upstream portion of the catalyst coat layer is 10 g/L or more to 80 g/L or less based on the volume of the substrate in some embodiments, or may be 20 g/L or more to 60 g/L or less. When the content of the OSC material in the upstream portion is 10 g/L or more to 80 g/L or less, the high NOx purification ability is ensured in the upstream portion.

The upstream portion of the catalyst coat layer may contain any other component in addition to the catalyst metal and the OSC material. The other component is not specifically limited and includes a metal oxide and the like. When the upstream portion of the catalyst coat layer contains the other component, its content is 80 g/L or less based on the volume of the substrate in some embodiments, or may be 60 g/L or less.

A metal contained in the metal oxide includes, for example, one or more metals selected from group 3, group 4, and group 13 of the periodic table and a lanthanoid-based metal. When the metal oxide contains the oxides of two or more metals, it may be any of a mixture of two or more metal oxides, a composite oxide containing two or more metals, or a mixture of one or more metal oxides and one or more composite oxides.

The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxide of one or more metals selected from Y, La, Ce, Ti, Zr, and Al in some embodiments. As the metal oxide, alumina ($Al_2O_3$) or a composite oxide of $Al_2O_3$ and lanthana ($La_2O_3$) is used in some embodiments.

In the upstream portion of the catalyst coat layer, the particle size-controlled Rh fine particles and Pt are supported on carrier particles in some embodiments. The carrier particles are not specifically limited, and for example, the above-described OSC materials and the other metal oxides can be used. In some embodiments, the particle size-controlled Rh fine particles are supported on the OSC materials. In other embodiments, Pt may be supported on the alumina ($Al_2O_3$) or the composite oxide of $Al_2O_3$ and lanthana ($La_2O_3$). As the supporting method, a common supporting method, such as an impregnation supporting method, an adsorption supporting method, and a water-absorption supporting method, can be used.

When the particle size-controlled Rh fine particles supported on the carrier particles are used, the support amount of the particle size-controlled Rh fine particles is, for example, 5% by weight or less, 3% by weight or less, 1% by weight or less, 0.7% by weight or less, 0.5% by weight or less, 0.3% by weight or less, or 0.2% by weight or less based on the weight of the carrier particles. The support amount of the particle size-controlled Rh fine particles is, for example, 0.01% by weight or more, 0.02% by weight or more, 0.05% by weight or more, 0.07% by weight or more, 0.1% by weight or more, 0.2% by weight or more, 0.5% by weight or more, or 1% by weight or more based on the weight of the carrier particles.

When the particle size-controlled Rh fine particles supported on the carrier particles are used, the particle size-controlled Rh fine particles can be supported on the carrier particles by bringing the carrier particles into contact with a Rh fine particle precursor dispersion, which contains Rh fine particle precursors preliminarily controlled to a predetermined particle size distribution, and subsequently performing calcination.

The Rh fine particle precursor dispersion can be manufactured by, for example, any of the following methods.

(1) a method (Method 1) that causes an acidic solution of a Rh compound to react with a basic solution in a reactor in which a clearance of a reaction field is set to a predetermined range; and (2) a method (Method 2) that mixes the acidic solution of the Rh compound with the basic solution to react and subsequently performs a stirring treatment in a high speed mixer.

In Method 1, by the use of the reactor in which the clearance of the reaction field is set to the predetermined range when causing the acidic solution of the Rh compound (for example, inorganic acid salt of Rh) to react with the basic solution (for example, aqueous solution of nitrogen-containing organic compound), the particle size and the particle size distribution of the Rh fine particle precursors (for example, hydroxides of Rh) contained in the obtained dispersion can be controlled.

Clearance adjustment members included in the reactor may be two flat plates, a combination of a flat plate and a wave-shaped plate, narrow tubes, and the like. The clearance of the reaction field can be appropriately set corresponding to a desired particle size and a desired particle size distribution. As the reactor in which the clearance of the reaction field is set to the predetermined range, for example, a micro reactor that includes an appropriate clearance adjustment member is usable.

In Method 2, the acidic solution of the Rh compound (for example, inorganic acid salt of Rh) is reacted with the basic solution (for example, aqueous solution of nitrogen-containing organic compound) to generate the Rh fine particle precursors as particles having large particle sizes, the stirring treatment of the Rh fine particle precursors is performed in the high speed mixer, and a strong shearing force is applied to disperse the Rh fine particle precursors, thereby controlling the average particle size and the particle size distribution of the dispersed Rh fine particle precursors.

The particle size-controlled Rh fine particles can be supported on the carrier particles by bringing the Rh fine particle precursor dispersion prepared as described above into contact with the carrier particles and subsequently performing the calcination.

Meanwhile, Pt supported on the carrier particles is used, the support amount of Pt is, for example, 10% by weight or less, 5% by weight or less, 3% by weight or less, or 2% by weight or less based on the weight of the carrier particles. The support amount of Pt is, for example, 0.01% by weight or more, 0.02% by weight or more, 0.05% by weight or more, 0.07% by weight or more, 0.1% by weight or more, 0.2% by weight or more, or 0.5% by weight or more based on the weight of the carrier particles.

The downstream portion of the catalyst coat layer contains rhodium (Rh) as a catalyst metal. In the exhaust gas purification catalyst of the present disclosure, since a part of the harmful component in the exhaust gas is efficiently purified in the upstream portion containing the particle size-controlled Rh fine particles and Pt, the Rh usage in the downstream portion can be reduced. Especially, since NOx in the exhaust gas is efficiently purified with the small use amount of Rh in the upstream portion by the use of the particle size-controlled Rh fine particles in the upstream portion, the Rh usage in the downstream portion also can be reduced.

In the downstream portion of the catalyst coat layer, Rh is used in the form of the Rh fine particles in some embodiments. The average particle size of the Rh fine particles is not specifically limited, and ordinarily 0.5 nm or more to 5.0 nm or less, or 1.0 nm or more to 2.0 nm or less in some embodiments.

As Rh in the downstream portion of the catalyst coat layer, the above-described particle size-controlled Rh fine particles are used in some embodiments. The use of the particle size-controlled Rh fine particles in the downstream portion of the catalyst coat layer ensures further improvement of the NOx purification ability of the catalyst. Accordingly, in some embodiments, the upstream portion of the catalyst coat layer contains the above-described particle size-controlled Rh fine particles and Pt, and the downstream portion of the catalyst coat layer contains the above-described particle size-controlled Rh fine particles.

The content of Rh in the downstream portion of the catalyst coat layer is 0.01 g/L or more to 1.0 g/L or less based on the volume of the substrate in some embodiments, or may be 0.1 g/L or more to 0.4 g/L or less. When the Rh content in the downstream portion is 0.01 g/L or more to 1.0 g/L or less, the high NOx purification ability and the high low-temperature activity of the catalyst can be provided at the same time.

The total content of the particle size-controlled Rh fine particles in the upstream portion and Rh in the downstream portion of the catalyst coat layer is 0.01 g/L or more to 1.0 g/L or less based on the volume of the substrate in some embodiments, or may be 0.1 g/L or more to 0.5 g/L or less.

The downstream portion of the catalyst coat layer may contain a catalyst metal other than Rh. As the catalyst metal, a platinum group noble metal, such as ruthenium (Ru), palladium (Pd), osmium (Os), iridium (Ir), and platinum (Pt), can be used.

The downstream portion of the catalyst coat layer contains an OSC material in some embodiments. The downstream portion containing the OSC material ensures the high NOx purification ability in the downstream portion.

The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, a ceria-zirconia ($CeO_2$—$ZrO_2$) composite oxide is used in some embodiments because of the high oxygen storage capacity and the relatively low price. The ceria-zirconia composite oxide may contain an oxide of a metallic element other than Ce or Zr. The metallic element other than Ce or Zr is a rare earth element (note that, Ce is excluded) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments, or may be La and Nd. The ceria-zirconia composite oxide is used in a form of a composite oxide with lanthana ($La_2O_3$) and neodymium oxide ($Nd_2O_3$) in some embodiments. The mixture ratio of ceria to zirconia in the ceria-zirconia composite oxide is $CeO_2/ZrO_2$=0.2 or more to 9.0 or less based on the weight in some embodiments.

The content of the OSC material in the downstream portion of the catalyst coat layer is 1 g/L or more to 80 g/L or less based on the volume of the substrate in some embodiments, or may be 5 g/L or more to 50 g/L or less. When the content of the OSC material in the downstream portion of the catalyst coat layer is 1 g/L or more to 80 g/L or less, the high NOx purification ability is ensured in the downstream portion.

The downstream portion of the catalyst coat layer may contain any other component in addition to the catalyst metal and the OSC material. The other component is not specifically limited and includes a metal oxide and the like. When the downstream portion of the catalyst coat layer contains the other component, its content is 100 g/L or less based on the volume of the substrate in some embodiments, or may be 80 g/L or less.

A metal contained in the metal oxide includes, for example, one or more metals selected from group 3, group 4, and group 13 of the periodic table and a lanthanoid-based metal. When the metal oxide contains the oxides of two or more metals, it may be any of a mixture of two or more metal oxides, a composite oxide containing two or more metals, or a mixture of one or more metal oxides and one or more composite oxides.

The metal oxide may be the oxides of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxides of one or more metals selected from Y, La, Ce, Ti, Zr, and Al in some embodiments. As the metal oxide, alumina ($Al_2O_3$), a composite oxide of $Al_2O_3$ and lanthana ($La_2O_3$), or a composite oxide of yttria ($Y_2O_3$), lanthana ($La_2O_3$) and zirconia ($ZrO_2$) is used in some embodiments.

In the downstream portion of the catalyst coat layer, Rh is supported on carrier particles in some embodiments. The carrier particles are not specifically limited, and for example, the above-described OSC materials and the other metal oxides can be used. In some embodiments, Rh in the downstream portion of the catalyst coat layer is supported on the metal oxides other than the OSC materials. As the supporting method, a common supporting method, such as an impregnation supporting method, an adsorption supporting method, and a water-absorption supporting method, can be used.

When Rh supported on the carrier particles is used, the support amount of Rh is, for example, 5% by weight or less, 3% by weight or less, 1% by weight or less, 0.7% by weight or less, 0.5% by weight or less, 0.3% by weight or less, or 0.2% by weight or less based on the weight of the carrier particles. The support amount of Rh is, for example, 0.01% by weight or more, 0.02% by weight or more, 0.05% by weight or more, 0.07% by weight or more, 0.1% by weight or more, 0.2% by weight or more, 0.5% by weight or more, or 1% by weight or more based on the weight of the carrier particles.

The exhaust gas purification catalyst of the present disclosure can be produced by coating the substrate with a slurry containing the components of the catalyst coat layer by a method known to those skilled in the art. In one embodiment, for example, a predetermined range is coated with a slurry containing Rh, an OSC material and a metal oxide from a downstream end surface using a known method, and drying and calcining are performed at a predetermined temperature for a predetermined time period, thus forming a downstream portion of a catalyst coat layer on a substrate. Subsequently, a predetermined range is coated with a slurry containing the particle size-controlled Rh fine particles, Pt, an OSC material, and a metal oxide from an upstream end surface of the substrate using a known method, and drying and calcining are performed at a predetermined temperature for a predetermined time period, thus forming an upstream portion.

EXAMPLES

The following further specifically describes the present disclosure using Examples. However, the technical scope of the present disclosure is not limited to Examples.

<Preparation of Catalysts>
Used Raw Material
Material 1: $Al_2O_3$: 4% by weight-$La_2O_3$ composite $Al_2O_3$
Material 2: ZC (OSC material): 21% by weight-$CeO_2$, 72% by weight-$ZrO_2$, 1.7% by weight-$La_2O_3$, 5.3% by weight-$Nd_2O_3$ composite oxide
Material 3: ZC (OSC material): 30% by weight-$CeO_2$, 60% by weight-$ZrO_2$, 5% by weight-$La_2O_3$, 5% by weight-$Y_2O_3$ composite oxide
Material 4: ZY: 6% by weight-$La_2O_3$, 10% by weight-$Y_2O_3$ composite $ZrO_2$
Material 5: Pt/$Al_2O_3$: material in which Pt is supported on the material 1
Material 6: particle size-controlled Rh dispersion
Material 7: Rh/ZY: material in which Rh is supported on the material 4
Material 8: particle size-controlled Rh/ZC: material in which Rh of the material 6 is supported on the material 3
Material 9: beaker method Rh dispersion
Material 10: Rh/ZC: material in which Rh is supported on the material 3
Material 11: particle size-controlled Rh/ZY: material in which Rh of the material 6 is supported on the material 4
Material 12: beaker method Rh/ZC: material in which Rh of the material 9 is supported on the material 3
Substrate: cordierite honeycomb substrate of 875 cc (400 cells square, wall thickness 4 mil)

The material 5 to the material 12 were prepared as follows.

Material 5: Pt/$Al_2O_3$

A Pt nitrate solution was contacted with the material 1, and subsequently calcination was performed, thereby obtaining the material 5 in which Pt was supported on the material 1 in the support amount of 3% by weight.

Material 6: particle size-controlled Rh dispersion 110 g of Rh (III) nitrate was added in 110 mL of ion exchanged water of and dissolved, thereby preparing an acidic solution (pH 1.0) of the Rh compound.

An aqueous tetraethylammonium hydroxide solution (concentration 175 g/L, pH 14) was prepared as an organic base solution.

Using a reactor (micro reactor) that included two flat plates as the clearance adjustment members, with a method of introducing the acidic solution of the Rh compound and the organic base solution into a reaction field in which the clearance was set to 10 μm, both liquids were reacted under a condition in which a mole ratio (TEAH/RN) of tetraethylammonium hydroxide (TEAH) to Rh nitrate (RN) was 18 to prepare a Rh fine particle precursor dispersion. The obtained Rh fine particle precursor dispersion had pH 14. The median diameter (D50) of the Rh fine particle precursors contained in the obtained Rh fine particle precursor dispersion was measured by a dynamic light scattering method (DLS), and the median diameter (D50) was 2.0 nm.

Material 7: Rh/ZY

A Rh nitrate solution was contacted with the material 4, and subsequently calcination was performed, thereby obtaining the material 7 in which Rh was supported on the material 4 in the support amount of 0.9% by weight. The average particle size of the Rh fine particles measured by a transmission electron microscope was 0.70 nm.

Material 8: Particle Size-Controlled Rh/ZC

The material 6 was contacted with the material 3, and subsequently calcination was performed, thereby obtaining the material 8 in which Rh was supported on the material 3 in the support amount of 0.45% by weight. The average particle size of the Rh fine particles measured by the transmission electron microscope was 1.40 nm, and the standard deviation σ of the particle size was 0.48 nm. In the particle size distribution of the particle size-controlled Rh fine particles, the proportion of fine particles having the particle size of less than 1.0 nm was smaller than that of the beaker method Rh of the material 12.

Material 9: Beaker Method Rh Dispersion

The material 9 was prepared similarly to the preparation of the material 6 except that the acidic solution of the Rh compound was reacted with the organic base solution in a beaker without using the reactor that included the clearance adjustment members.

Material 10: Rh/ZC

A Rh nitrate solution was contacted with the material 3, and subsequently calcination was performed, thereby obtaining the material 10 in which Rh was supported on the material 3 in the support amount of 0.45% by weight. The average particle size of the Rh fine particles measured by the transmission electron microscope was 0.70 nm.

Material 11: Particle Size-Controlled Rh/ZY

The material 6 was contacted with the material 4, and subsequently calcination was performed, thereby obtaining the material 11 in which Rh was supported on the material 4 in the support amount of 0.9% by weight. The average particle size of the Rh fine particles measured by the transmission electron microscope was 1.40 nm, and the standard deviation σ of the particle size was 0.48 nm.

Material 12: Beaker Method Rh/ZC

The material 12 in which Rh of the material 9 was supported on the material 3 was prepared similarly to the preparation of the material 8. The average particle size of the Rh fine particles measured by the transmission electron microscope was 1.42 nm, and the standard deviation σ of the particle size was 0.94 nm.

Example 1

The material 1, the material 2, the material 7, and an $Al_2O_3$-based binder were added to distilled water while stirring them, and a slurry 1 in which these materials were suspended was prepared. Subsequently, the prepared slurry 1 was poured into a substrate from a downstream end surface, and an unnecessary portion was blown off by a blower, thus coating a wall surface of the substrate with the materials. The coat width was adjusted to 80% of the entire length of the substrate. The coat amount was adjusted such that the material 1 was 25 g/L, the material 2 was 15 g/L, and the material 7 was 50 g/L based on the volume of the substrate. Finally, drying was performed by a dryer at 120° C. for two hours, and subsequently, calcination was performed by an electric furnace at 500° C. for two hours, thus preparing a downstream portion of a catalyst coat layer.

Similarly, the material 5, the material 8, and the $Al_2O_3$-based binder were added to distilled water while stirring them, and a slurry 2 in which these materials were suspended was prepared. The slurry 2 was poured into the substrate, on which the downstream portion was formed, from an upstream end surface, and an unnecessary portion was blown off by the blower, thus coating the wall surface of the substrate with the materials. The coat width was adjusted to 40% of the entire length of the substrate. The coat amount was adjusted such that the material 5 was 30 g/L and the material 8 was 40 g/L based on the volume of the substrate. Finally, drying was performed by the dryer at 120° C. for two hours, and subsequently, calcination was performed by the electric furnace at 500° C. for two hours, thus preparing an upstream portion of the catalyst coat layer.

Examples 2 and 3

The catalysts of Examples 2 and 3 were prepared similarly to Example 1 except that Rh amounts of the slurries 1 and 2 were each changed as indicated in Table 1.

Comparative Example 1

The catalyst of Comparative Example 1 was prepared similarly to Example 1 except that the material 8 in the upstream portion was substituted with the material 3 and the Rh amount of the slurry 2 was changed as indicated in Table 1.

Comparative Example 2

The catalyst of Comparative Example 2 was prepared similarly to Comparative Example 1 except that the material 7 in the downstream portion was substituted with the material 11.

Comparative Example 3

The catalyst of Comparative Example 3 was prepared similarly to Example 1 except that the material 8 in the upstream portion was substituted with the material 10.

Comparative Example 4

The catalyst of Comparative Example 4 was prepared similarly to Example 1 except that the material 8 in the upstream portion was substituted with the material 12.

Comparative Examples 5 and 6

The catalysts of Comparative Examples 5 and 6 were prepared similarly to Comparative Example 3 except that the Rh amounts of the slurries 1 and 2 were each changed as indicated in Table 1.

Table 1 indicates compositions and noble metal amounts in the upstream portion and the downstream portion of the catalysts of Examples 1 to 3 and Comparative Examples 1 to 6. The noble metal amount is a noble metal amount (g/substrate 1 L) to the volume of the substrate.

TABLE 1

| | Upstream portion | | | Downstream portion | | |
|---|---|---|---|---|---|---|
| | Used material | Material composition | Noble metal amount (g/L) | Used material | Material composition | Noble metal amount (g/L) |
| Example 1 | Material 5 | Pt/Al$_2$O$_3$ | Pt 1.0 | Material 1 | Al$_2$O$_3$ | Rh 0.36 |
| | Material 8 | Particle size-controlled Rh/ZC | Rh 0.09 | Material 2 | ZC | |
| | | | | Material 7 | Rh/ZY | |
| Example 2 | Material 5 | Pt/Al$_2$O$_3$ | Pt 1.0 | Material 1 | Al$_2$O$_3$ | Rh 0.30 |
| | Material 8 | Particle size-controlled Rh/ZC | Rh 0.15 | Material 2 | ZC | |
| | | | | Material 7 | Rh/ZY | |
| Example 3 | Material 5 | Pt/Al$_2$O$_3$ | Pt 1.0 | Material 1 | Al$_2$O$_3$ | Rh 0.26 |
| | Material 8 | Particle size-controlled Rh/ZC | Rh 0.19 | Material 2 | ZC | |
| | | | | Material 7 | Rh/ZY | |
| Comparative Example 1 | Material 5 | Pt/Al$_2$O$_3$ | Pt 1.0 | Material 1 | Al$_2$O$_3$ | Rh 0.45 |
| | Material 3 | ZC | | Material 2 | ZC | |
| | | | | Material 7 | Rh/ZY | |
| Comparative Example 2 | Material 5 | Pt/Al$_2$O$_3$ | Pt 1.0 | Material 1 | Al$_2$O$_3$ | Rh 0.45 |
| | Material 3 | ZC | | Material 2 | ZC | |
| | | | | Material 11 | Particle size-controlled Rh/ZY | |
| Comparative Example 3 | Material 5 | Pt/Al$_2$O$_3$ | Pt 1.0 | Material 1 | Al$_2$O$_3$ | Rh 0.36 |
| | Material 10 | Rh/ZC | Rh 0.09 | Material 2 | ZC | |
| | | | | Material 7 | Rh/ZY | |
| Comparative Example 4 | Material 5 | Pt/Al$_2$O$_3$ | Pt 1.0 | Material 1 | Al$_2$O$_3$ | Rh 0.36 |
| | Material 12 | Beaker method Rh/ZC | Rh 0.09 | Material 2 | ZC | |
| | | | | Material 7 | Rh/ZY | |
| Comparative Example 5 | Material 5 | Pt/Al$_2$O$_3$ | Pt 1.0 | Material 1 | Al$_2$O$_3$ | Rh 0.30 |
| | Material 10 | Rh/ZC | Rh 0.15 | Material 2 | ZC | |
| | | | | Material 7 | Rh/ZY | |
| Comparative Example 6 | Material 5 | Pt/Al$_2$O$_3$ | Pt 1.0 | Material 1 | Al$_2$O$_3$ | Rh 0.26 |
| | Material 10 | Rh/ZC | Rh 0.19 | Material 2 | ZC | |
| | | | | Material 7 | Rh/ZY | |

<Durability Test>

The durability test was performed for each of the prepared catalysts using an actual engine. Specifically, the durability test was performed as follows. The catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 46 hours.

<Performance Evaluation>

NOx Conversion Rate

The exhaust gases having air-fuel ratios (A/F) 14.4 and 14.8 were alternately supplied at a catalyst inlet gas temperature of 350° C., and the NOx conversion rate at Ga=28 g/s was evaluated. The NOx conversion rate was calculated by averaging the NOx conversion rates in 60 seconds from a time point after a lapse of two minutes.

NOx 50% Conversion Temperature

For the catalysts of Examples 1 to 3 and Comparative Example 1, the exhaust gas purification catalysts on which the durability test had been performed were each installed to an exhaust system of a L-type four-cylinder engine, the exhaust gas having air-fuel ratio (A/F)=14.4 was supplied, and the temperature was increased at the catalyst bed temperature 200° C. to 600° C. (20° C./minute) under the condition of Ga=35 g/s. The temperature (NOx 50% conversion temperature) when the NOx conversion rate was 50% was measured, and the low-temperature activity was evaluated. The lower this value is, the higher the low-temperature activity is.

Figure 3:
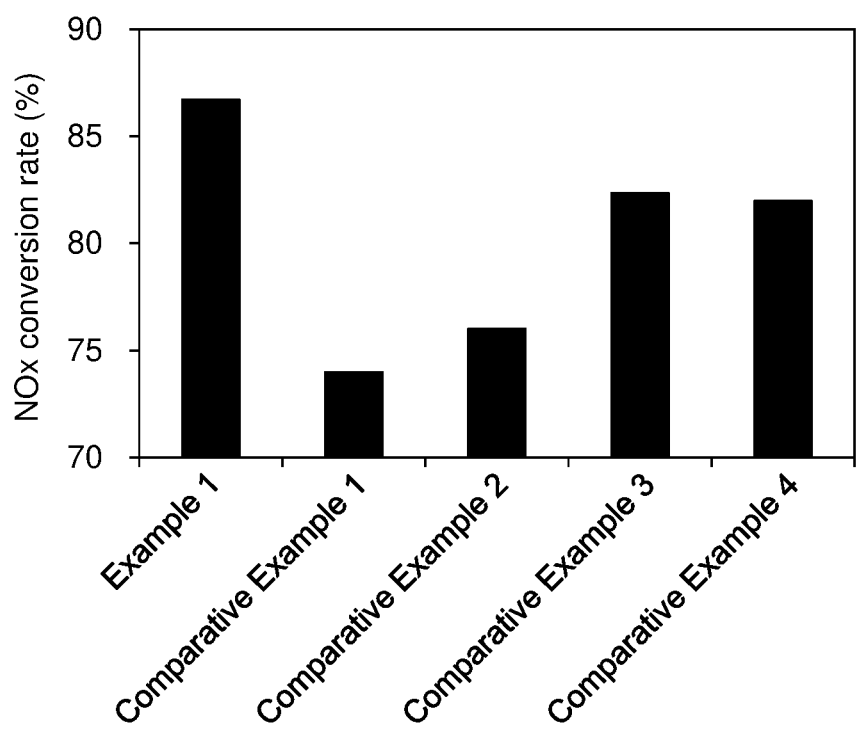
FIG. 3 is a graph illustrating NOx conversion rates in repeated atmosphere of rich and lean for catalysts of Example 1 and Comparative Examples 1 to 4.

Table 2 indicates the Rh amounts in the upstream portion and the downstream portion and details of the Rh fine particles of the catalysts of Example 1 and Comparative Examples 1 to 4. In Table 2, Rh type of the Rh fine particles means the raw material used for preparing the material. FIG. 3 illustrates the NOx conversion rate in repeated atmosphere of rich and lean for catalysts of Example 1 and Comparative Examples 1 to 4.

particles than using the Rh fine particles whose average particle size was out of the specific range of the present disclosure. Accordingly, it was shown that the effect of improving the NOx purification ability of the catalyst of the Example was a specific effect obtained by controlling the particle size and the addition position of the Rh fine particles. In addition, it was shown that the NOx purification ability was improved not only by controlling the average particle size of the Rh fine particles but also by controlling the standard deviation σ of the particle size to the predetermined range to reduce the fine particles (Example 1 and Comparative Example 4).

Figure 4:
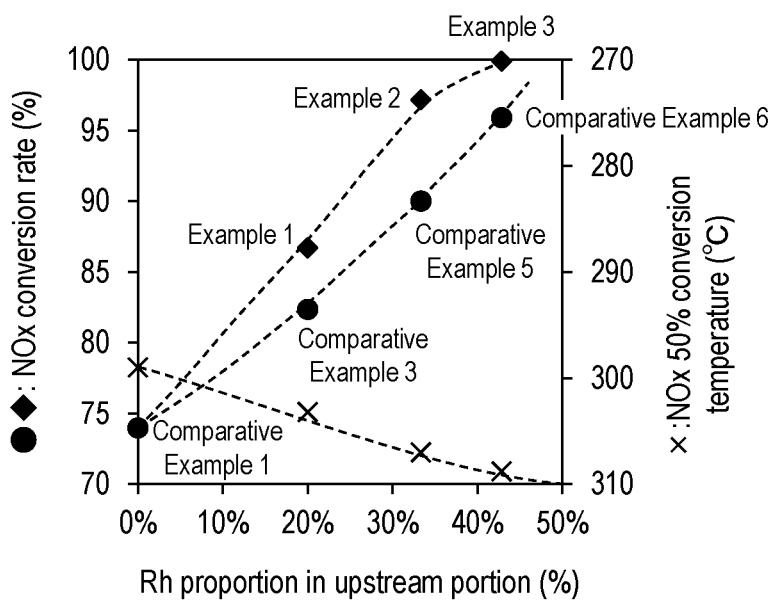
FIG. 4 is a graph illustrating a relation between a proportion of Rh content in an upstream portion, and each of a NOx conversion rate and a NOx 50% conversion temperature in the repeated atmosphere of rich and lean.

FIG. 4 illustrates a relation between a proportion of Rh content in the upstream portion to the total content of Rh in the upstream portion and the downstream portion, and each of the NOx conversion rate and the NOx 50% conversion temperature in the repeated atmosphere of rich and lean. In FIG. 4, the NOx conversion rate is indicated by the measurement results of Examples 1 to 3 and Comparative Examples 1, 3, 5, and 6, and the NOx 50% conversion temperature is indicated by the measurement results of Examples 1 to 3 and Comparative Example 1. As illustrated in FIG. 4, as the proportion of the Rh content in the upstream portion increased, the NOx conversion rate increased in any of the catalysts of the Examples and the catalysts of the Comparative Example. The NOx conversion rate of the catalysts of the Examples in which the particle size-controlled Rh fine particles were used were significantly higher than those of the catalysts of the Comparative Examples. However, when the proportion of the Rh content in the upstream portion increased to around 40%, the increase range of the NOx conversion rate tended to decrease in the catalysts of the Examples compared with the catalysts of the Comparative Examples. When the proportion of the Rh content in the upstream portion increased and the proportion of the Rh content in the downstream portion decreased, the

TABLE 2

| | Rh amount (g/L) | | Rh fine particles | | | | |
|---|---|---|---|---|---|---|---|
| | Upstream portion | Downstream portion | Used material | Rh type | Average particle size (nm) | Standard deviation (nm) | Addition position |
| Example 1 | 0.09 | 0.36 | Material 8 | Particle size-controlled Rh | 1.40 | 0.48 | Upstream portion |
| Comparative Example 1 | 0 | 0.45 | Material 7 | Rh nitrate | 0.70 | — | Downstream portion |
| Comparative Example 2 | 0 | 0.45 | Material 11 | Particle size-controlled Rh | 1.40 | 0.48 | Downstream portion |
| Comparative Example 3 | 0.09 | 0.36 | Material 10 | Rh nitrate | 0.70 | — | Upstream portion |
| Comparative Example 4 | 0.09 | 0.36 | Material 12 | Beaker method Rh | 1.42 | 0.94 | Upstream portion |

As illustrated in FIG. 3, for any catalysts in which the particle size-controlled Rh fine particles and the Rh fine particles whose average particle size was out of the specific range of the present disclosure were used as the Rh fine particles, by adding a part of the Rh fine particles in the downstream portion to the upstream portion, the NOx conversion rate tended to increase compared with the catalysts in which the Rh fine particles were added only to the downstream portion (Example 1 and Comparative Examples 1 to 3). The range of the increase of the NOx conversion rate was greater when using the particle size-controlled Rh fine NOx 50% conversion temperature tended to increase to reduce the low-temperature activity of the catalyst. Accordingly, the content of the particle size-controlled Rh fine particles in the upstream portion has an intended range from a perspective of providing the high NOx purification ability and the high low-temperature activity at the same time, and it may be in a range of 1.0% by weight or more to 45% by weight or less.

All publications, patents, and patent applications cited herein are incorporated herein by reference in their entirety.

DESCRIPTION OF SYMBOLS

10 Exhaust gas purification catalyst
11 Substrate
12 Upstream portion
13 Downstream portion
14 Catalyst coat layer
20 Exhaust gas purification catalyst
21 Substrate
22 Upstream portion
23 Downstream portion
24 Catalyst coat layer

What is claimed is:

1. An exhaust gas purification catalyst comprising:
a substrate; and
a catalyst coat layer formed on the substrate, the catalyst coat layer having a two-layer structure,
wherein the catalyst coat layer includes an upstream portion on an upstream side and a downstream portion on a downstream side in an exhaust gas flow direction, and a part or all of the upstream portion is formed on a part of the downstream portion,
wherein the upstream portion contains Rh fine particles and Pt,
wherein the Rh fine particles have an average particle size measured by a transmission electron microscope observation of 1.0 nm or more to 2.0 nm or less, and a standard deviation σ of the particle size of 0.8 nm or less, and
wherein the downstream portion contains Rh.

2. The exhaust gas purification catalyst according to claim 1,
wherein a content of the Rh fine particles in the upstream portion is 1.0% by weight or more to 45% by weight or less based on a total content of the Rh fine particles in the upstream portion and Rh in the downstream portion.

3. The exhaust gas purification catalyst according to claim 1,
wherein the upstream portion further contains an OSC material that has an oxygen storage capacity.

* * * * *